United States Patent [19]

Luffel et al.

[11] Patent Number: 5,596,556
[45] Date of Patent: Jan. 21, 1997

[54] LINEAR DISPLACEMENT AND SUPPORT APPARATUS FOR USE IN A CARTRIDGE HANDLING SYSTEM

[75] Inventors: Robert Luffel, Greeley; Paul Coffin, Fort Collins, both of Colo.

[73] Assignee: Hewlett-Packard Company, Palo Alto, Calif.

[21] Appl. No.: 20,160

[22] Filed: Feb. 18, 1993

[51] Int. Cl.⁶ ............................ G11B 17/22; G11B 17/08
[52] U.S. Cl. .......................................... 369/36; 360/98.04
[58] Field of Search ........................ 360/98.04, 98.06, 360/92; 369/36, 38, 178, 191, 192; 414/932; 187/20, 27

[56] References Cited

U.S. PATENT DOCUMENTS

| | | | |
|---|---|---|---|
| 3,565,217 | 2/1971 | St. Louis | 187/27 |
| 3,854,604 | 12/1974 | Peterson et al. | 214/16.4 A |
| 4,600,083 | 7/1986 | Parent et al. | 187/20 |
| 4,614,474 | 9/1986 | Sudo | 369/36 |
| 4,675,856 | 6/1987 | Rudy et al. | 369/36 |
| 4,757,401 | 7/1988 | Teranishi | 360/98 |
| 4,815,056 | 3/1989 | Toi et al. | 369/36 |
| 4,836,621 | 6/1989 | Teranishi | 360/98.05 |
| 4,878,137 | 10/1989 | Yamashita et al. | 360/98.05 |
| 4,945,430 | 7/1990 | Konishi et al. | 360/92 |
| 4,998,232 | 3/1991 | Methlie et al. | 369/36 |
| 5,001,582 | 3/1991 | Numasaki | 360/98.06 |
| 5,003,417 | 3/1991 | Grant | 360/92 |
| 5,010,536 | 4/1991 | Wanger et al. | 369/36 |
| 5,014,255 | 5/1991 | Wanger et al. | 369/36 |
| 5,043,962 | 8/1991 | Wanger et al. | 369/36 |
| 5,060,211 | 10/1991 | Blanding | 369/36 |
| 5,062,093 | 10/1991 | Christie et al. | 369/36 |
| 5,101,387 | 3/1992 | Wanger et al. | 369/36 |
| 5,184,336 | 2/1993 | Wanger et al. | |

*Primary Examiner*—Stuart S. Levy
*Assistant Examiner*—George Joseph Letscher

[57] ABSTRACT

An apparatus for linearly displacing a cartridge engaging assembly along a predetermined displacement path and for supporting the cartridge engaging assembly at a fixed orientation relative to its displacement path. The apparatus includes single or multiple elongate flexible members fixedly secured to the cartridge engaging assembly at at least three points thereon, a flexible member engagement assembly (e.g. pulleys) fixedly positioned relative to the displacement path, and a drive assembly operatively connected to at least one elongate flexible member.

13 Claims, 5 Drawing Sheets

LINEAR DISPLACEMENT AND SUPPORT APPARATUS FOR USE IN A CARTRIDGE HANDLING SYSTEM

BACKGROUND OF THE INVENTION

The present invention relates generally to a linear displacement and support apparatus for use in a cartridge handling system, and more particularly to an apparatus for linearly displacing a cartridge engaging assembly along a predetermined displacement path and for supporting the cartridge engaging assembly at a fixed orientation relative to its displacement path.

Optical disks such as "compact disks"("CDs") are commonly used for storing musical works, as well as audio-visual works. Furthermore, due to the huge storage capacity of optical disks as compared to conventional magnetic storage media, optical disks known as "ROM (read only memory) disks" have become increasingly popular for use in the computer industry. In addition, rewritable optical disks are now being used in the computer industry. Each of these types of disks may be mounted in parallelepiped-shaped cartridges for purposes of storing and handling the disks. Also used in the computer industry for data storage are tape cartridges such as Digital Audio Tape (DAT) cartridges and 8-mm tape cartridges.

For large databases consisting of many disk or tape cartridges, it is necessary to provide a system for handling the cartridges. Various features and components of a cartridge handling system are disclosed in U.S. Pat. Nos. 4,998,232 dated Mar. 5, 1991 for OPTICAL DISK HANDLING APPARATUS WITH FLIP LATCH of Methlie et al.; 5,014,255 dated May 7, 1991 for OPTICAL DISK CARTRIDGE HANDLING APPARATUS WITH PASSIVE CARTRIDGE ENGAGEMENT ASSEMBLY of Wanger et al.; 5,010,536 dated Apr. 23, 1991 for CARTRIDGE HANDLING SYSTEM of Wanger et al.; 5,043,962 dated Aug. 27, 1991 for CARTRIDGE HANDLING SYSTEM of Wanger et al.; 5,062,093 dated Oct. 29, 1991 for OPTICAL DISK INSERTION APPARATUS of Christie et al.; 5,101,387 dated Mar. 31, 1992 for LATERAL DISPLACEMENT CONTROL ASSEMBLY FOR AN OPTICAL DISK HANDLING SYSTEM of Wanger et al.; and 5,184,336 dated Feb. 2, 1993 for LATERAL DISPLACEMENT CONTROL ASSEMBLY FOR AN OPTICAL DISK HANDLING SYSTEM of Wanger et al., which are each hereby specifically incorporated by reference for all that is disclosed therein.

In general, a cartridge handling system may include a cartridge storage system for storing the cartridges at corresponding storage locations. A cartridge handling system may also include a cartridge engaging assembly for retrieving a desired cartridge from its corresponding storage location, moving the cartridge into alignment with a disk or tape drive, and inserting the cartridge into the drive. Specifically, in a cartridge handling system wherein the stored cartridges and associated disk or tape drive are arranged in a longitudinally-extending, two-dimensional array consisting of vertically extending columns and horizontally extending rows, it is necessary for a cartridge engaging assembly to be capable of linear movement among the columns and rows. Thus, a cartridge handling system may also include an apparatus for providing linear displacement to a cartridge engaging assembly.

A cartridge handling system may further include an apparatus for supporting the cartridge engaging assembly within the cartridge handling system. "Support" of the cartridge engaging assembly as used herein refers to the functions of suspending the cartridge engaging assembly within the cartridge handling system and maintaining the stability of the cartridge engaging assembly. "Maintaining the stability" of the cartridge engaging assembly as used herein refers to the function of allowing substantially linear displacement of the cartridge engaging assembly in a desired direction while preventing undesired displacement, e.g. transverse or rotational movement.

In order to decrease production and maintenance costs and maximize the efficiency of the cartridge handling system, it is generally desirable to minimize the mass of each component of the system, including the linear displacement and support apparatus for the cartridge engaging assembly. Among other advantages, minimizing the mass of the linear displacement and support apparatus will maximize the speed with which the cartridge engaging assembly may linearly move among the columns and rows of the storage system. Specifically, in such an apparatus, it is desirable to minimize the use of relatively massive components such as leadscrews. Such a relatively massive component may also require a relatively large motor to provide sufficient driving torque, which increases the total mass of the system.

Similarly, it is generally desirable to avoid the use of costly precision tracks or rails for guidance and support.

It is also desirable to minimize the volume requirements of the linear displacement and support apparatus so that it may be mounted in a relatively small space within the cartridge handling system.

Furthermore, to control the displacement of the cartridge engaging assembly as is necessary, for example, to align it with a cartridge or drive, stability of the cartridge engaging assembly must be maintained throughout its linear displacement. In order to maintain adequate stability, it is generally desirable for a cartridge engaging assembly to be supported at multiple points on the apparatus, rather than at only one point on the apparatus. Use of a component such as a leadscrew which provides support at only one point on the apparatus may necessitate use of additional components such as rigid rails or guides to maintain the stability of the cartridge engaging assembly. Rigid rails or guides which may be used with a single-point support component such as a leadscrew must be able to support cantilever loads as well as provide accurate positional guidance.

Finally, it would be generally desirable for a linear displacement and support apparatus to be adaptable to effect either vertical or horizontal displacement of the cartridge engaging assembly. Specifically, an apparatus used for vertical displacement which relies on the downward force of gravity for any of its displacement and/or support functions could probably not be used in a horizontal orientation. Similarly, an apparatus used for horizontal displacement which would be adversely affected by the downward force of gravity could probably not be used in a vertical orientation.

SUMMARY OF THE INVENTION

In accordance with the above objects, the present invention is directed to an apparatus for linearly displacing a cartridge engaging assembly along a predetermined displacement path and for supporting the cartridge engaging assembly at a fixed orientation relative to its displacement path.

The apparatus may comprise elongate flexible member means fixedly secured to the cartridge engaging assembly at at least three linear strand portions thereof for supporting and displacing the cartridge engaging assembly. The elongate flexible member means may be comprised of at least one elongate flexible member and preferably has at least three linear strand portions extending parallel to a predetermined displacement path. All three linear strand portions are connected to the cartridge engaging assembly and move in the same direction at the same rate in response to drive force applied thereto.

The apparatus may also comprise a flexible member engagement means fixedly positioned relative to the displacement path for maintaining the plurality of elongate flexible member means linear strand portions in parallel relationship with the displacement path. The flexible member engagement means also tensions each of the elongate flexible members in the apparatus. The flexible member engagement means may be comprised of a plurality of pulley members.

The apparatus may also include drive means operatively connected to at least one elongate flexible member for simultaneously driving the plurality of linear strand portions in the same direction at the same rate. The drive means may be comprised of a capstan operatively engaged with a drive motor.

The apparatus may further include guide means for preventing transverse displacement and rotational displacement of the cartridge engaging assembly.

The present invention is also directed to a cartridge handling system which may include a cartridge storage system for storing a plurality of cartridges at a plurality of corresponding storage locations. The cartridge handling system may also include a cartridge engaging assembly for retrieving one of the cartridges from its corresponding storage location, moving the cartridge to a drive, and inserting the cartridge into the drive. The cartridge handling system may further include a first displacement means (e.g. a horizontal displacement assembly) for linearly displacing the cartridge engaging assembly and the cartridge engaged thereby. The cartridge handling system may further include a second displacement means (e.g. a vertical displacement assembly) for linearly displacing the cartridge engaging assembly and the cartridge engaged thereby. The second displacement means may be comprised of an apparatus for linearly displacing and supporting a cartridge engaging assembly such as described above.

BRIEF DESCRIPTION OF THE DRAWINGS

Illustrative and presently preferred embodiments of the invention are shown in the accompanying drawings in which.

DETAILED DESCRIPTION OF THE INVENTION

The Invention In General

Figure 1:
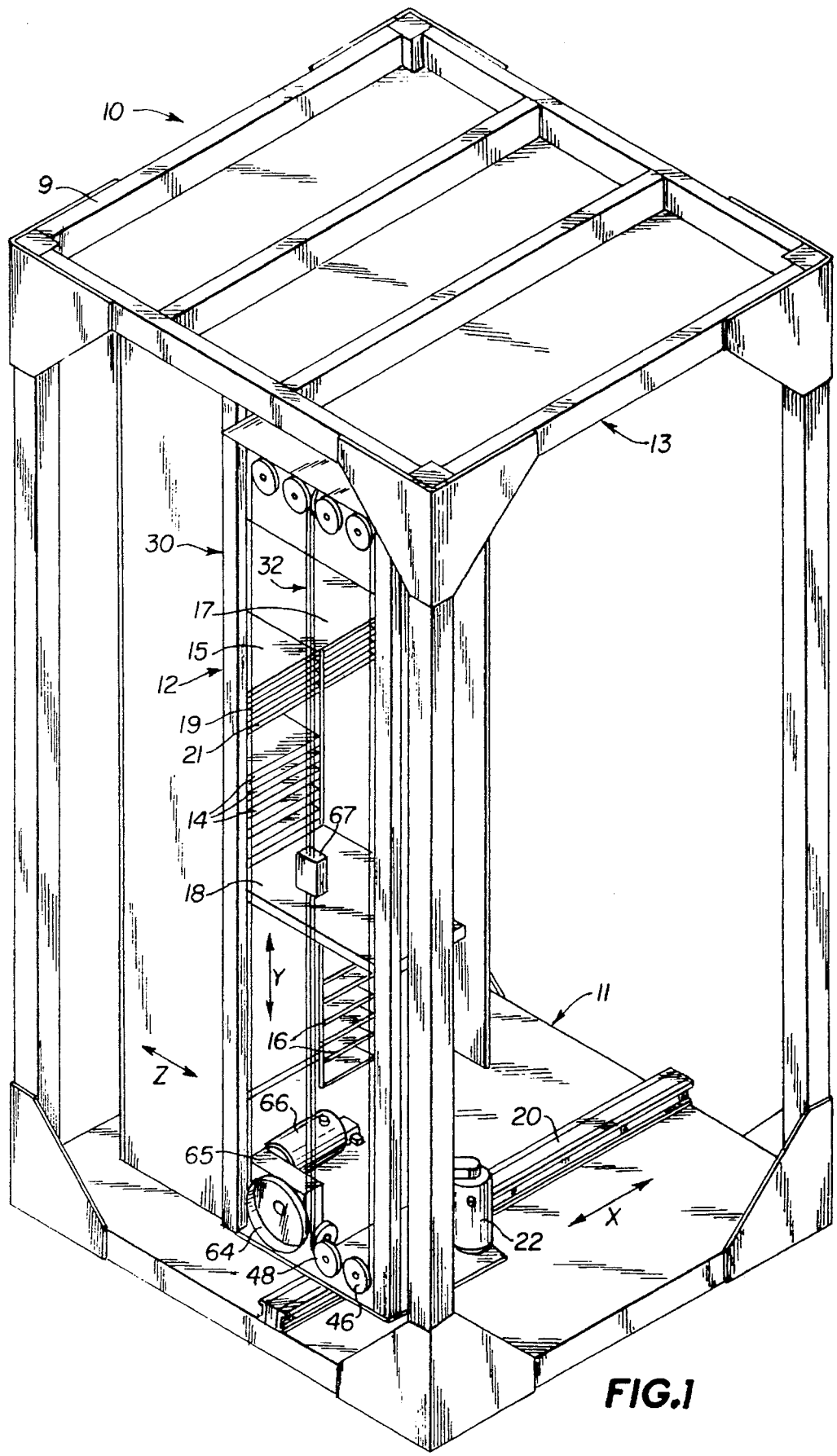
FIG. 1 is a schematic front and right perspective view of a cartridge handling system including a first embodiment of the linear displacement and support apparatus of the present invention.

A preferred embodiment of the present invention is shown in FIGS. 1–4. In general, the invention is directed to an apparatus 30 for linearly displacing a cartridge engaging assembly 18 along a predetermined displacement path VV (FIG. 2) and for supporting the cartridge engaging assembly 18 at a fixed orientation relative to the displacement path VV. The apparatus 30 may comprise elongate flexible member means 32 fixedly secured to the cartridge engaging assembly 18 at at least three linear strand portions 41, 43, 45 (FIG. 2) thereof for supporting and displacing the cartridge engaging assembly 18. The apparatus 30 may also comprise flexible member engagement means 40 (e.g. pulleys) fixedly positioned relative to the displacement path VV for maintaining the plurality of elongate flexible member means linear strand portions 41, 43, 45 in parallel relationship with the displacement path VV and for tensioning the elongate flexible member means 32. The apparatus may also comprise drive means 62 operatively connected to the elongate flexible member means 32 for simultaneously driving the plurality of linear strand portions 41, 43, 45 in the same direction (e.g. "y", FIG. 1) at the same rate.

The present invention is also directed to a cartridge handling system 10, FIG. 1. The cartridge handling system 10 may comprise a cartridge storage system 12 for storing a plurality of cartridges (e.g. 14) at a plurality of corresponding storage locations. The cartridge handling system 10 may also comprise a cartridge engaging assembly 18 for retrieving one of the cartridges 14 from one of the corresponding storage locations, moving the cartridge 14 to a drive 16, and inserting the cartridge 14 into the drive 16. The cartridge handling system 10 may further comprise a first displacement means (e.g. horizontal displacement assembly 20) for linearly displacing the cartridge engaging assembly 18 and the cartridge 14 engaged thereby. The cartridge handling system 10 may further comprise a second displacement means (e.g. vertical displacement assembly 30 described above) for linearly displacing the cartridge engaging assembly 18 and the cartridge 14 engaged thereby. The second displacement means 30 may comprise an apparatus for linearly displacing a cartridge engaging assembly 18 along a predetermined displacement path VV and for supporting the cartridge engaging assembly 18 at a fixed orientation relative to the displacement path VV.

Having thus described the present invention in general, various components of the invention will now be described in more detail.

The Invention In Detail

FIG. 1 illustrates a cartridge handling system 10 which may include a housing 9 which encloses a cartridge storage system 12 for storing cartridges at corresponding storage locations. The cartridge storage system 12 may include a plurality of stored cartridges 14, e.g. optical disk cartridges or tape cartridges, and one or more associated disk or tape drives 16 which are arranged in a longitudinally-extending, two-dimensional array consisting of vertically extending columns, e.g. 15, 17, and horizontally extending rows, e.g. 19, 21.

The cartridge handling system 10 may also include a cartridge engaging assembly 18 which may be of the type described in U.S. Pat. No. 5,010,536 dated Apr. 23, 1991 for CARTRIDGE HANDLING SYSTEM of Wanger et al., incorporated by reference above. The basic function of the cartridge engaging assembly 18 is to retrieve a desired cartridge 14 from its corresponding storage location, move the cartridge 14 to a disk or tape drive 16, and insert the cartridge 14 into the disk or tape drive 16. Thus, it is necessary for the cartridge engaging assembly 18 to be capable of horizontal and vertical movement (as indicated by "x" and "y") among the columns (e.g. 15, 17) and rows (e.g. 19, 21) of a cartridge storage system 10. It is also necessary for the cartridge engaging assembly 18 to be capable of cartridge engagement and movement in a longitudinal (plunging) direction (as indicated by "z").

A first embodiment of a linear displacement and support apparatus 30 for a cartridge engaging assembly 18 is shown in FIGS. 1–4, which is presently the best mode contemplated. The linear displacement and support apparatus 30 may be used to execute vertical movement ("y", FIG. 1) of the cartridge engaging assembly 18.

As shown in FIG. 1, horizontal (lateral) movement ("x", FIG. 1) of the cartridge engaging assembly 18 may be accomplished by mounting the linear displacement and support apparatus 30 on a rack and gear assembly 20 of a type conventionally known in the art. The rack and gear assembly 20 may be operatively connected by a gear box (not shown) or the like to a motor 22 mounted on the linear displacement and support assembly 30. To facilitate horizontal movement, a rack and gear assembly 20 may be positioned on the lower portion 11 of the cartridge handling system 10, and another rack and gear assembly (not shown) may be positioned on the upper portion 13 of the cartridge handling system 10.

It is important to note, however, that the linear displacement and support apparatus 30 of the present invention may also be used to execute horizontal ("x") movement of the cartridge engaging assembly 18 by mounting the apparatus 30 horizontally. More specifically, the linear displacement and support apparatus 30 of the present invention is not dependent upon the force of gravity for its operation. Furthermore, apparatus 30 if horizontally mounted (not shown) would not be adversely affected by the force of gravity. In addition, both vertical and horizontal movement may be accomplished in a cartridge handling system 10 with two linear displacement and support assemblies — one mounted vertically (e.g. 30) and the other mounted horizontally (not shown).

Figure 2:
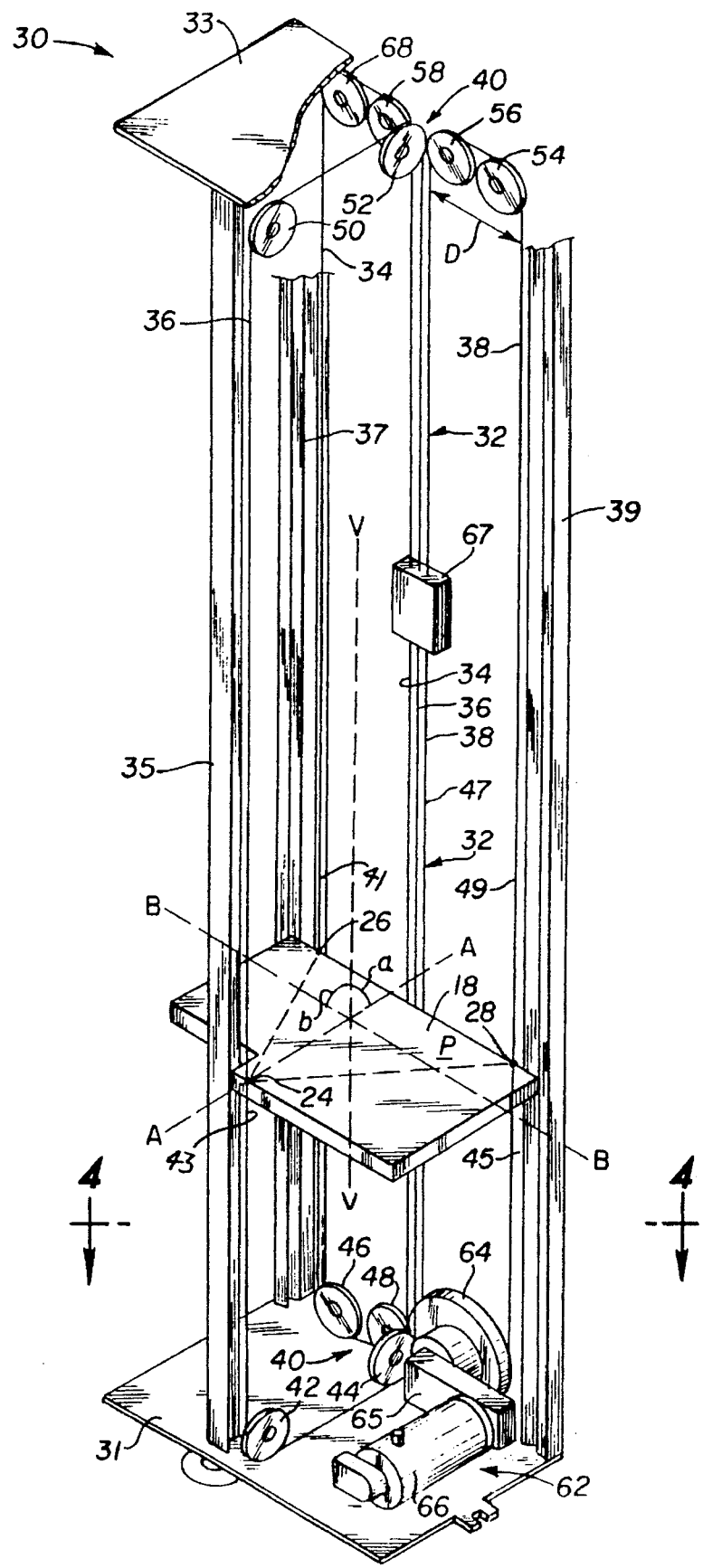
FIG. 2 is a partially cut-away, schematic front and left perspective view of the linear displacement and support apparatus of FIG. 1.
Figure 3:
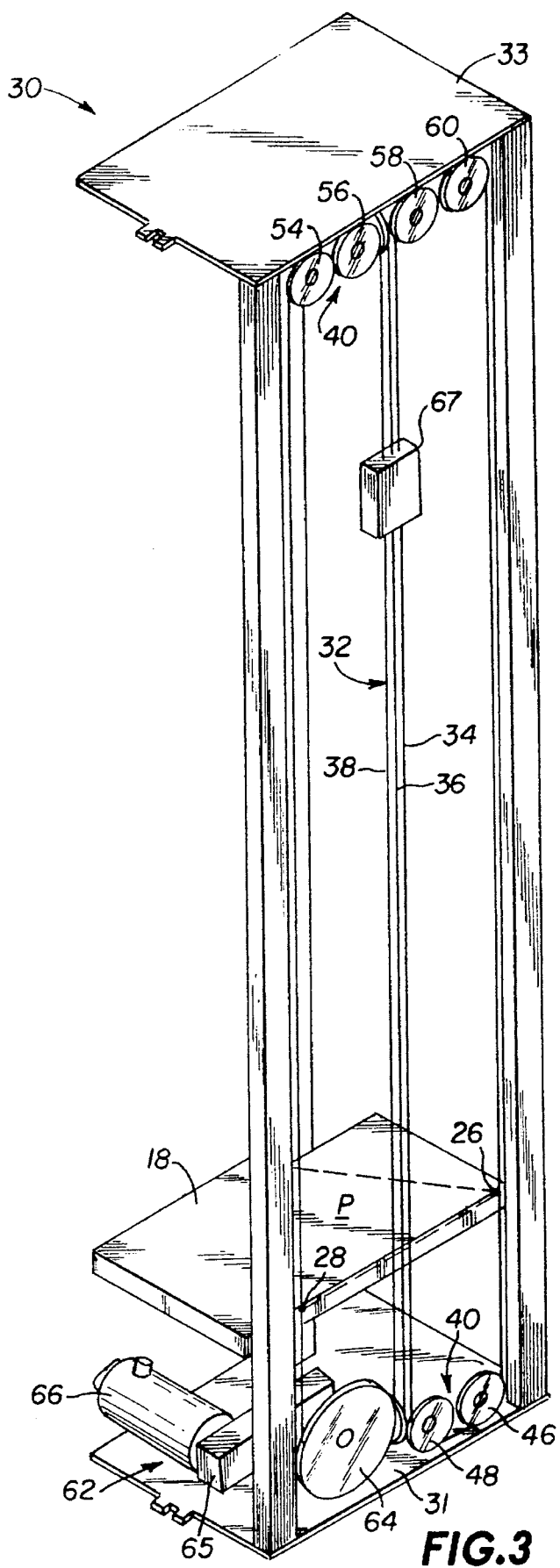
FIG. 3 is a schematic rear and left perspective view of the linear displacement and support apparatus of FIG. 1.

As best shown in FIGS. 2 and 3, the linear displacement and support apparatus 30 may include a lower base plate 31, an upper base plate 33, and a plurality of vertical beams 35, 37, 39 fixedly attached at opposite ends to the upper and lower base plates 31, 33. The base plates 31, 33 and the vertical beams 35, 37 and 39 are each preferably constructed from a high-strength, yet lightweight, material such as thin steel, aluminum, or the like.

The linear displacement and support apparatus 30 may also include elongate flexible member means 32 fixedly secured to the cartridge engaging assembly 18 for providing support thereto and for applying driving force thereto to displace the cartridge engaging assembly back and forth along a predetermined displacement path VV, FIG. 2.

The elongate flexible member means 32 may comprise a plurality of elongate flexible members 34, 36, 38. Each of the elongate flexible members 34, 36, 38 may be comprised of a cable such as that sold under the product name wire rope, manufactured by Sava Industries of 70 Riverdale Road, Riverdale, N.J. 07457. It should be noted that each elongate flexible member 34, 36, 38 could also be comprised of, for example, a frictionally-driven belt, a toothed belt, a steel band, a chain, or the like. The material used for each elongate flexible member 34, 36, 38 should be flexible, yet substantially nonstretchable along its length.

Each of the elongate flexible members 34, 36, 38 are fixedly secured in any conventional manner at one or more points, e.g. 24, 26, 28, respectively, to the cartridge engaging assembly 18. For example, when the elongate flexible members 34, 36, 38 are comprised of cables, each cable may be provided with one or more ball-shaped fittings (not shown) fixedly secured to the cable which may be fitted into corresponding grooves (not shown) on the cartridge engaging assembly.

In a preferred embodiment as shown in FIGS. 2 and 3, at least three elongate flexible members 34, 36, 38 are provided. Each elongate flexible member 34, 36, 38 is preferably fixedly secured to the cartridge engaging assembly 18 at one or more points 24, 26, 28, respectively, so that the cartridge engaging assembly 18 is supported at at least three points 24, 26, 28 thereon. Furthermore, at least three of these points, e.g. 24, 26, 28, are not located along the same axis. The three points 24, 26, 28 thus define plane "P" extending perpendicularly to the displacement path VV of the cartridge engaging assembly 18 as shown in phantom in FIGS. 2 and 3.

Such multiple-point support facilitates planar stability for the cartridge engaging assembly 18. Specifically, a cartridge engaging assembly 18 which is supported at a single point thereon may have a tendency to rotate around that point. Similarly, a cartridge engaging assembly 18 which is supported at only two points thereon may have a tendency to rotate around the axis on which the two points are located. However, these problems can be avoided by providing a cartridge engaging assembly 18 which is supported at three (or more) points 24, 26, 28 such as described above.

The elongate flexible member means 32 is preferably constructed and arranged with at least three linear strand portions 41, 43, 45 extending parallel to the displacement path VV. Each linear strand portion 41, 43, 45 is defined as a section of each elongate flexible member 34, 36, 38, respectively, extending above and below the point 24, 26, 28, respectively, at which the member 34, 36, 38 is attached to the cartridge engaging assembly 18. The linear strand portions 41, 43, 45 all move in the same direction at the same rate in response to drive force applied to the elongate flexible member means 32, as described in greater detail below.

With continued reference to FIGS. 2 and 3, the linear displacement and support apparatus 30 may also include flexible member engagement means 40 fixedly positioned relative to the displacement path VV. A function of the flexible member engagement means 40 is to maintain the plurality of elongate flexible member means 34, 36, 38 linear strand portions 41, 43, 45 in parallel relationship with the displacement path VV. Another function of the flexible member engagement means 40 is to tension the elongate flexible member means 34, 36, 38.

The flexible member engagement means 40 preferably comprises a plurality of pulley members 42, 44, 46, 48, 50, 52, 54, 56, 58, 60. Four pulley members (e.g. 42, 44, 46 and 48) are preferably mounted on the lower base plate 31, and six pulley members are preferably mounted on the upper base plate 33, as shown in FIGS. 2 and 3. Each pulley member 42, 44, etc. may have a diameter of, e.g., 1.8 inches, and a width of, e.g., 0.6 inches. Alternatively, the flexible member engagement means 40 may be comprised of rollers, toothed pulleys, or the like, which may depend upon the type of elongate flexible members used (e.g. frictionally-driven belts, toothed belts, steel bands, chains, etc.).

In a preferred embodiment, the pulley members may be configured in pairs having parallel rotation axes which may be comprised of a first pair 42, 44 mounted on the lower base plate 31; a second pair 46, 48 mounted on the lower base plate 31 perpendicularly to the first pair 42, 44; a third pair 50, 52 mounted on the upper base plate 33 directly above and parallel to the first pair 42, 44; a fourth pair 54, 56 mounted on the upper base plate 33 perpendicularly to the third pair 50, 52 and directly above the drive means 62 capstan 64 (the drive means 62 and capstan 64 are described in more detail below); and a fifth pair 58, 60 mounted on the upper base plate 33 parallel to the fourth pair 54, 56 and directly above the second pair 46, 48. Alternatively, each pulley member pair (e.g. 54, 56) may be replaced by a single, larger pulley member (not shown) which has a diameter "D", FIG. 2, equal to the distance between the outer portions of each pulley member pair (e.g. 54, 56). Three or more pulley members (not shown) may also replace each pulley member pair (e.g. 54, 56).

Each elongate flexible member 34, 36, 38 is in nonslipping engagement with at least one pulley member pair. Two of the elongate flexible members, e.g. 34, 36, are preferably each associated with two pulley member pairs — one pair mounted on the lower base plate 31, and the other pair mounted on the upper base plate 33. Specifically, elongate flexible member 34 may be in nonslipping engagement with pulley member pair 46, 48 on the lower base plate 31 and pulley member pair 58, 60 on the upper base plate 33. Elongate flexible member 36 may be similarly associated with pulley member pair 42, 44 on the lower base plate 31 and pulley member pair 50, 52 on the upper base plate 33. Elongate flexible member 38 may be similarly associated with pulley member pair 54, 56 on the upper base plate 33, and member 38 may be nonslipping engaged with a drive means 62 capstan 64 mounted on the lower base plate 31, as described in further detail below.

As shown in FIGS. 2 and 3, each elongate flexible member 34, 36, 38 is preferably configured in a continuous loop with two vertical portions (e.g. 47, 49 of member 38). The pulley members 42, 44, 46, etc. associated with each elongate flexible member 34, 36, 38 loop are spaced apart sufficiently, and each elongate flexible member 34, 36, 38 has an appropriate length (e.g. 120 inches), to maintain each elongate flexible member 34, 36, 38 taut about the associated pulley members 42, 44, 46, etc. Thus, all of the vertical portions (e.g. 47, 49) of all of the flexible members (e.g. 38) are taut and parallel. Since elongate flexible members such as cables may stretch and slacken over time, one or more conventionally-known tensioning devices (not shown) may be provided for each elongate flexible member 34, 36, 38. Tensioning devices may be mounted, for example, with pulley members 42, 44, 46, etc. so that the pulley members may be adjusted to take up any slack in the elongate flexible members 34, 36, 38. Tensioning devices may alternatively be mounted along each elongate flexible member 34, 36, 38, for example, at the points 24, 26, 28 where the members 34, 36, 38 are attached to the cartridge engaging assembly 18.

Still referring to FIGS. 2 and 3, the linear displacement and support apparatus 30 may further include drive means 62 operatively connected to the elongate flexible member means 32 for simultaneously driving the linear strand portions 41, 43, 45 in the same direction at the same rate as described above. The drive means 62 may be comprised of a capstan 64 mounted on the lower base plate 31 directly below the fourth pulley member pair 54, 56. The capstan 64 may be operatively connected to an electric drive motor 66 by a conventional gear box 65 or the like. To maintain the vertical portions (e.g. 47, 49) of all of the flexible members (e.g. 38) parallel to one another as described above, the capstan 64 preferably has a diameter equal to that of one pulley member pair, i.e. the capstan 64 has a diameter equal to the diameter "D" of the fourth pulley member pair 54, 56. The capstan 64 may also have a width of, e.g., 1.0 inch. The electric drive motor 66 is preferably a ⅛ hp, 24 V dc motor, such as motor model no. E-541, manufactured by Electro-Craft, 6950 Washington Avenue South, Eden Prairie, Minn., 55344. The drive means 62 may further include a remotely-mounted computer control system (not shown) for controlling the linear displacement of the cartridge engaging assembly 18 through appropriate control commands to motor 66.

In the preferred embodiment as shown in FIGS. 2 and 3, one elongate flexible member 38 is nonslippingly engaged with the capstan 64 so that the member 38 is driven by the drive means 62. Member 38 may be connected to the capstan 64 in any conventional manner. For example, a member 38 which is comprised of a cable could be provided with ball-shaped ends which could each be fitted into corresponding holes or "keys" in the capstan and thus held in place. A member 38 which is comprised of an endless belt could be wrapped around the capstan 64 and held in nonslipping engagement with the capstan 64 by frictional force.

The elongate flexible members 34, 36, 38 may be retained together at one or more points in any conventional manner, such as by one or more couplers 67 (only one shown) or the like, which allows the elongate flexible members 34, 36 to be driven with and at the same rate as member 38. As previously described, elongate flexible members 34, 36, 38 are fixedly connected to the cartridge engaging assembly 18 at points 24, 26, 28, respectively. Therefore, when the elongate flexible members 34, 36, 38 are driven, points 24, 26, 28 of the cartridge engaging assembly 18 are displaced at the same rate and thus maintain the cartridge engaging assembly 18 at a fixed orientation relative to its displacement path VV. In other words, longitudinal and lateral axes AA, BB of the cartridge engaging assembly 18 each remains oriented at fixed angles "a" and "b", respectively, with the axis of the displacement path VV. The elongate flexible members 34, 36, 38 thus act to support and maintain the stability of the cartridge engaging assembly 18 as well as to linearly displace it.

Figure 4:
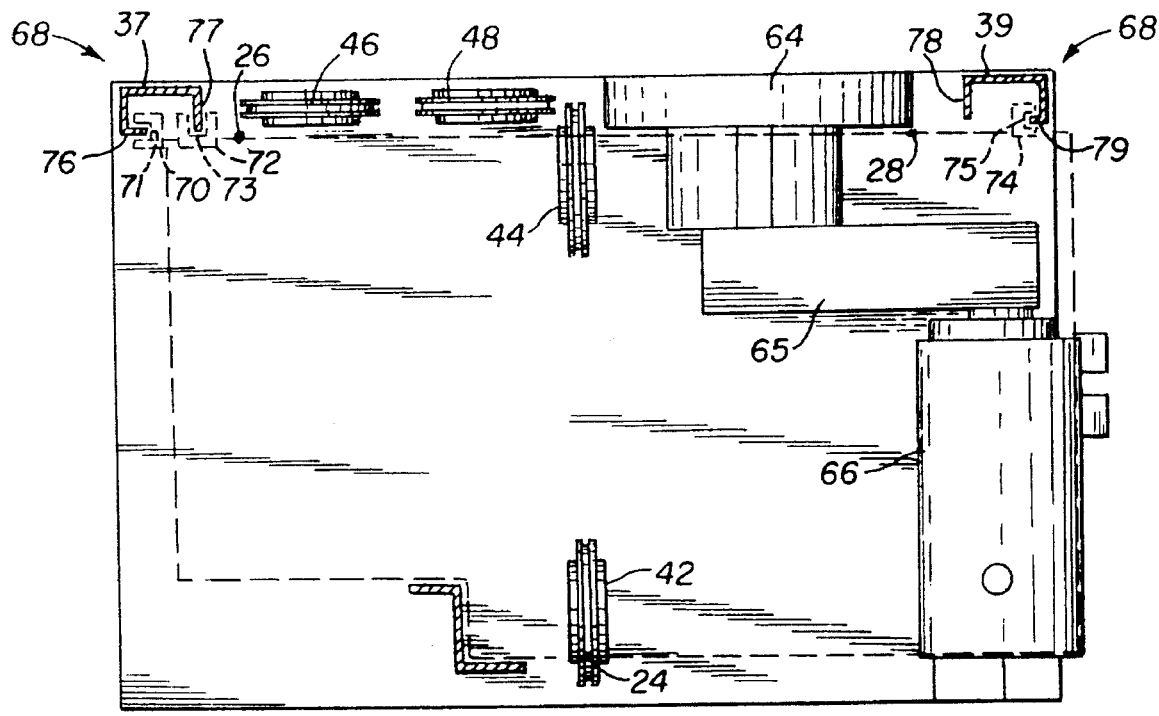
FIG. 4 is a schematic, cross sectional, top plan view of the linear displacement and support apparatus of FIG. 2 with portions thereof removed for clarity, and with the cartridge engaging assembly shown in phantom.

As shown in FIGS. 2 and 4, the linear displacement and support apparatus 30 may further include guide means 68 for preventing transverse and/or rotational displacement of the cartridge engaging assembly 18.

The guide means 68 is best shown in FIG. 4, which is a top plan view taken at Section 4—4 of FIG. 2, with portions thereof, including the elongate flexible member means 32, removed for clarity, and with the cartridge engaging assembly 18 shown in phantom. As illustrated in FIG. 4, the guide means 68 may include one or more, and preferably two, guide posts which are substantially u-shaped in cross-section and which may be comprised of vertical beams 37, 39. Each of the vertical beams 37, 39 has two edge portions 76, 77 and 78, 79, respectively.

The guide means 68 may also include a plurality of bearing members 70, 72, 74 (shown in phantom). The bearing members 70, 72, 74 are preferably comprised of bushing members which are also substantially u-shaped in cross-section and which are mounted on the cartridge engaging assembly 18. However, the bearing members 70, 72, 74 may also be comprised of rollers (not shown) or other substantially nonfrictional sliding or rolling components.

As shown in FIG. 4, the bearings 70, 72, 74 are preferably comprised of a first bushing member 70 having a first interior portion 71, a second bushing member 72 oriented perpendicularly to the first bushing member 70 and having a second interior portion 73, and a third bushing member 74 oriented 180° to the first bushing member 70 and having a third interior portion 75.

Referring to both FIGS. 2 and 4, as the cartridge engaging means 18 is displaced along its vertical displacement path VV, the first interior portion 71 of the first bushing member 70 is substantially nonfrictionally, slidingly engaged with the edge portion 76 of vertical beam 37; the second interior portion 73 of the second bushing member 72 is substantially nonfrictionally, slidingly engaged with the edge portion 77 of vertical beam 37; and the third interior portion 75 of the third bushing member 74 is substantially nonfrictionally, slidingly engaged with the edge portion 79 of vertical beam 37. This sliding engagement and the relative orientation of the bushing members 70, 72, 74 as shown in FIG. 4 and described above prevents transverse displacement (e.g. displacement along axis AA or BB, FIG. 2) of the cartridge engaging assembly, and also prevents rotational displacement (e.g. displacement around axis VV, FIG. 2, or an axis parallel thereto) of the cartridge engaging assembly 18.

Since the stability of the cartridge engaging assembly 18 is maintained by the elongate flexible members 34, 36, 38 as described above, the guide means 68 is not subject to any significant load during displacement of the cartridge engaging assembly 18. Specifically, during intended operation, no large lateral or longitudinal load is applied to the cartridge engaging assembly 18 which would be of sufficient magnitude to substantially strain the cable means. Thus, the guide means 68 of the present invention requires less precision and less rigidity than conventionally-used rails or guides such as those used with single-point-support components such as leadscrews. Therefore, the relative mass of the guide means 68 to the cartridge engaging assembly 18 may be very low, and the guide means 68 may be constructed from lightweight materials. As previously noted, in the preferred embodiment, the guide posts (vertical beams) 37, 39 may be constructed from a high-strength, yet lightweight, material such as thin steel, aluminum or the like. The bushing members 70, 72, 74 may be constructed from plastic.

Figure 5:
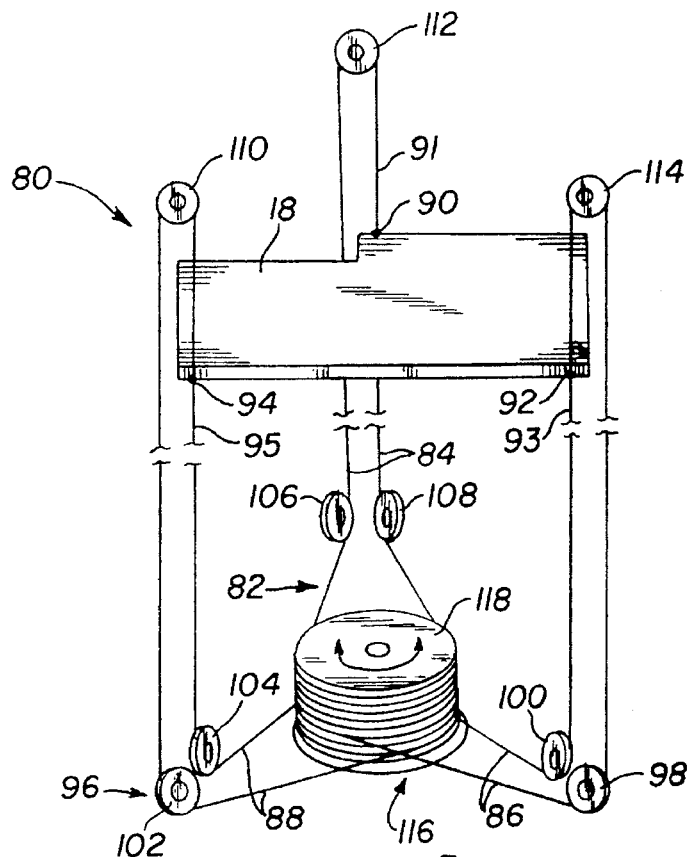
FIG. 5 is a schematic front perspective view of a second embodiment of the linear displacement and support apparatus of the present invention.

FIG. 5 illustrates a partial view of a second embodiment of a linear displacement and support apparatus 80 which may be used in the cartridge handling system 10, FIG. 1. All of the components and functional features of the embodiment shown in FIG. 5 may be substantially identical to the embodiment shown in FIGS. 1–4, except where otherwise indicated below.

The linear displacement and support apparatus 80 may include elongate flexible member means 82 fixedly secured to the cartridge engaging assembly 18 for providing support and applying driving force thereto. The elongate flexible member means 82 may comprise a plurality of elongate flexible members 84, 86, 88. Each elongate flexible member 84, 86, 88 may be comprised of a cable, a frictionally-driven belt, a toothed belt, a steel band, a chain, or the like. Each elongate flexible member 84, 86, 88 may be fixedly attached at one or more points 90, 92, 94 to the cartridge engaging assembly 18, such as described above with reference to FIGS. 2 and 3. Each elongate flexible member 84, 86, 88 has a linear strand portion 91, 93, 95, respectively, extending above and below points 90, 92, 94, and all linear strand portions 91, 93, 95 are parallel to one another.

Still referring to FIG. 5, the linear displacement and support apparatus 80 may also include flexible member engagement means 96 which may be comprised of pulley members 98, 100, 102, 104, 106, 108, 110, 112, 114 mounted on upper and lower base plates (not shown). Each elongate flexible member 84, 86, 88 is nonslippingly engaged with the associated pulley members 98, 100, 102, etc. as shown.

The linear displacement and support apparatus 80 may also include drive means 116 operatively connected to the elongate flexible member means 82 for simultaneously driving the linear strand portions 91, 93, 95 in the same direction at the same rate as described above with reference to FIGS. 2 and 3. The drive means 116 may be comprised of a capstan 118 operatively connected to an electric drive motor (not shown).

Each elongate flexible member 84, 86, 88 is nonslippingly engaged with the capstan 118 in any conventional manner as described above with reference to FIGS. 2 and 3. The diameter of the capstan 118 is constant in all areas of engagement by the elongate flexible members 84, 86, 88. Since all three elongate flexible members 84, 86, 88 are driven simultaneously at the same rate, and each of the members 84, 86, 88 is attached at a linear strand portion 91, 93, 95 thereof to the cartridge engaging assembly 18, the cartridge engaging assembly 18 will be uniformly displaced as described above with reference to FIGS. 2 and 3.

Figure 6:
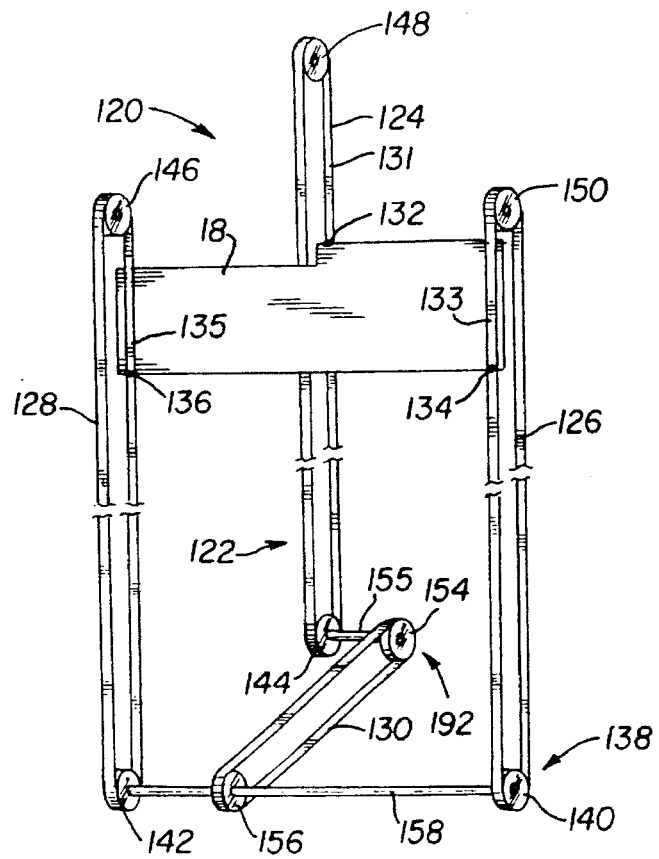
FIG. 6 is a schematic front perspective view of a third embodiment of the linear displacement and support apparatus of the present invention.

FIG. 6 illustrates a partial view of a third embodiment of a linear displacement and support apparatus 120 which may be used in the cartridge handling system 10, FIG. 1. All of the components and functional features of the embodiment shown in FIG. 6 may be substantially identical to the embodiment shown in FIG. 1–4, except where otherwise indicated below.

The linear displacement and support apparatus 120 may include elongate flexible member means 122 fixedly secured to the cartridge engaging assembly 18 for providing uniform support and applying driving force thereto. The elongate flexible member means 122 may comprise a plurality of elongate flexible members 124, 126, 128, which may each be comprised of a belt or band as shown (e.g. a frictionally-driven belt, toothed belt, steel band, etc.), or alternatively may be comprised of a cable, a chain, or the like. A linking drive belt 130 may be similarly constructed. The elongate flexible members 124, 126, 128 may each be fixedly attached at one or more points 132, 134, 136, respectively, to the cartridge engaging assembly 18 as shown. Each elongate flexible member 124, 126, 128 has a linear strand portion 131, 133, 135, and each linear strand portion 131, 133, 135 is parallel to one another.

Still referring to FIG. 6, the linear displacement and support apparatus 120 may also include flexible member engagement means 138 which may be comprised of pulley members 140, 142, 144, 146, 148, 150 mounted on upper and lower base plates (not shown). Each of the elongate flexible members 124, 126, 128 are nonslippingly engaged with the pulley members 140, 142, 144, etc. as shown.

The linear displacement and support apparatus 120 may also include drive means 152 operatively connected to the elongate flexible member means 122 for simultaneously driving the linear strand portions 131, 133, 135 in the same direction at the same rate as described above with reference to FIGS. 2 and 3. The drive means 152 may be comprised of an electric drive motor (not shown) operatively connected to a drive pulley member 154. The drive pulley member 154 is connected to pulley member 144 by a first drive shaft 155 as shown in FIG. 6. The linking drive belt 130 is nonslippingly engaged to the drive pulley member 154 and also to a connecting pulley member 156 as shown. The connecting pulley member 156 connects pulley members 140, 142 by means of a second drive shaft 158.

Therefore, each of the elongate flexible members 124, 126, 128 are operatively connected to the drive means 152, and thus all of the elongate flexible members 124, 126, 128 are driven simultaneously at the same rate. Furthermore, since each of the uniformly-driven elongate flexible members 124, 126, 128 is attached at a linear strand portion 131, 133, 135, respectively, to the cartridge engaging assembly 18, the cartridge engaging assembly will be uniformly displaced as described above with reference to FIGS. 2 and 3.

Figure 7:
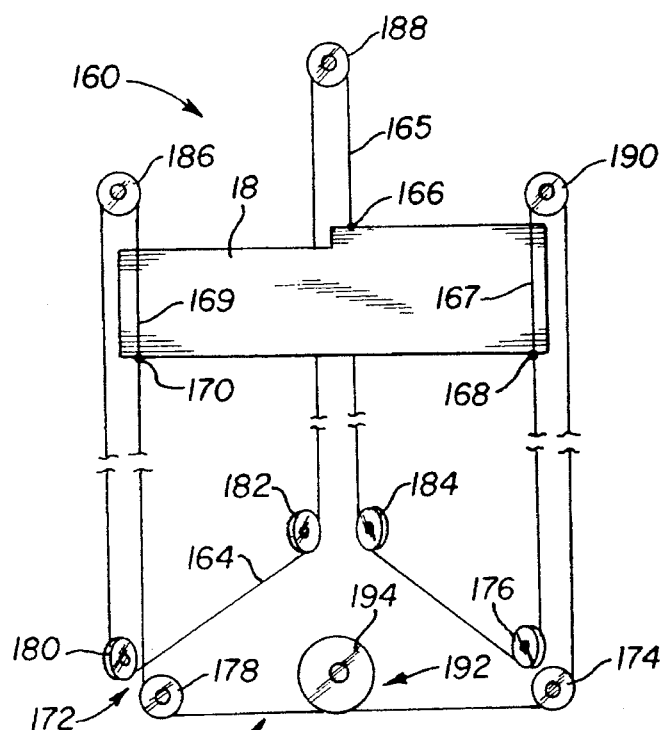
FIG. 7 is a schematic front perspective view of a fourth embodiment of the linear displacement and support apparatus of the present invention.

FIG. 7 illustrates a partial view of a fourth embodiment of a linear displacement and support apparatus 160 which may be used in the cartridge handling system 10, FIG. 1. All of the components and functional features of the embodiment shown in FIG. 7 may be substantially identical to the embodiment shown in FIGS. 1–4, except where otherwise indicated below.

The linear displacement and support apparatus 160 may include elongate flexible member means 162 fixedly secured to the cartridge engaging assembly 18 for providing uniform support and applying driving force thereto. The elongate flexible member means 162 may comprise a single elongate flexible member 164, which may be comprised of a cable, a frictionally-driven belt, a toothed belt, a steel band, a chain, or the like. The elongate flexible member 164 may be fixedly attached at preferably three points 166, 168, 170 to the cartridge engaging assembly 18 as shown. The elongate flexible member 164 preferably has three linear strand portions 165, 167, 169 which are parallel to one another.

Still referring to FIG. 7, the linear displacement and support apparatus 160 may also include flexible member engagement means 172 which may be comprised of pulley members 174, 176, 178, 180, 182, 184, 186, 188, 190 mounted on upper and lower base plates (not shown). The elongate flexible member 164 is nonslippingly engaged with the pulley members 174, 176, 178, etc. as shown.

The linear displacement and support apparatus 160 may also include drive means 192 operatively connected to the elongate flexible member means 162 for simultaneously driving the linear strand portions 165, 167, 169 in the same direction at the same rate as described above with reference to FIGS. 2 and 3. The drive means 192 may be comprised of a capstan 194 operatively connected to an electric drive motor (not shown).

The elongate flexible member 164 is nonslippingly engaged with the capstan 194 in any conventional manner as described above with reference to FIGS. 2 and 3. Since only one elongate flexible member 164 is driven which is attached to the cartridge engaging assembly 18 at the linear strand portions 165, 167, 169, the cartridge engaging assembly 18 will be uniformly displaced as described above.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:
1. A cartridge handling system, comprising:
   a) a cartridge storage system for storing a plurality of cartridges at a plurality of corresponding storage locations;
   b) a cartridge engaging assembly for retrieving one of said cartridges from one of said corresponding storage locations, moving said cartridge to a drive, and inserting said cartridge into said drive;
   c) first displacement means for linearly displacing said cartridge engaging assembly and said cartridge engaged thereby; and
   d) second displacement means for linearly displacing said cartridge engaging assembly and said cartridge engaged thereby, said second displacement means comprising an apparatus for linearly displacing a cartridge engaging assembly along a predetermined displacement path and for supporting said cartridge engaging assembly at a fixed orientation relative to said displacement path, said apparatus comprising:
      i) elongate flexible member means fixedly secured to said cartridge engaging assembly at at least three laterally spaced apart linear strand portions thereof for supporting and displacing said cartridge engaging assembly;
      ii) flexible member engagement means located remotely from said cartridge engaging assembly and fixedly positioned relative to said displacement path for maintaining said plurality of elongate flexible member means linear strand portions in parallel relationship with said displacement path and for tensioning said elongate flexible member means; and
      iii) drive means operatively connected to said elongate flexible member means for simultaneously driving said plurality of linear strand portions in the same direction at the same rate.

2. The invention of claim 1 further comprising guide means for preventing transverse displacement and rotational displacement of said cartridge engaging assembly.

3. The invention of claim 2 further comprising an upper base plate and a lower base plate, wherein said guide means comprises:
   a) at least one vertical beam member fixedly mounted at opposite ends to said upper base plate and said lower base plate; and
   b) a plurality of bearing members mounted on said cartridge engaging assembly, each of said bearing members being nonfrictionally engaged with one of said at least one vertical beam member.

4. The invention of claim 1, said elongate flexible member means comprising a single elongate flexible member fixedly secured to said cartridge engaging assembly at least three laterally spaced apart points thereon.

5. The invention of claim 4, said elongate flexible member being selected from the group consisting of a cable, a belt, and a band.

6. The invention of claim 1, said elongate flexible member means comprising a plurality of elongate flexible members, each of said elongate flexible members being fixedly secured at least one point said cartridge engaging assembly.

7. The invention of claim 6, each of said elongate flexible members being selected from the group consisting of a cable, a belt, and a band.

8. The invention of claim 1, said elongate flexible member means comprising a plurality of elongate flexible members, each of said elongate flexible members being fixedly secured at least one point to said cartridge engaging assembly, each of said elongate flexible members being retained together at at least one point, and one of said elongate flexible members being nonslippingly engaged with said drive means.

9. The invention of claim 1 wherein said flexible member engagement means comprises a plurality of puller members.

10. The invention of claim 1 wherein said drive means comprises a capstan operatively engaged with an electric drive motor, said elongate flexible member means being nonslippingly engaged with said capstan.

11. The invention of claim 1 comprising at least three of said linear strand portions attached to said cartridge engaging assembly at least three points on said cartridge engaging assembly, said points defining a plane which is nonparallel to said predetermined displacement path.

12. An apparatus for linearly displacing a cartridge engaging assembly along a predetermined displacement path and for supporting said cartridge engaging assembly at a fixed orientation relative to said displacement path, comprising:

elongate flexible member means fixedly secured to said cartridge engaging assembly at at least three laterally spaced apart linear strand portions thereof for supporting and displacing said cartridge engaging assembly, said elongate flexible member means comprising a single elongate flexible member fixedly secured to said cartridge engaging assembly at at least three laterally spaced apart points thereon;

b) flexible member engagement means located remotely from said cartridge engaging assembly and fixedly positioned relative to said displacement path for maintaining said plurality of elongate flexible member means linear strand portions in parallel relationship with said displacement path and for tensioning said elongate flexible member means; and drive means operatively connected to said elongate flexible member means simultaneously driving said plurality of linear strand portions in the same direction at the same rate.

13. The invention of claim 12, said elongate flexible member being selected from the group consisting of a cable, a belt, and a band.

* * * * *

UNITED STATES PATENT AND TRADEMARK OFFICE
CERTIFICATE OF CORRECTION

PATENT NO. : 5,596,556
DATED : 1/21/97
INVENTOR(S) : Robert Luffel, et al.

It is certified that error appears in the above-indentified patent and that said Letters Patent is hereby corrected as shown below:

Column 12, Claim 6, line 61: Delete "at least one point said" and insert therefor --at least one point to said--.

Column 13, Claim 8, line 1: Delete "at least one point" and insert therefor --at at least one point--.

Column 13, Claim 9, line 6: Delete "puller" and insert therefor --pulley--.

Column 13, Claim 11, line 13: Delete "at least three points" and insert therefor --at at least three points--.

Column 13, Claim 12, line 20: Before "elongate" insert an --a)--.

Column 14, Claim 12, line 14: Before "drive" insert a --c)--.

UNITED STATES PATENT AND TRADEMARK OFFICE
CERTIFICATE OF CORRECTION

PATENT NO. : 5,596,556
DATED : 1/21/97
INVENTOR(S) : Robert Luffel, et al.

It is certified that error appears in the above-indentified patent and that said Letters Patent is hereby corrected as shown below:

Column 14, Claim 12, line 15: Between "means" and "simultaneously" insert therefor --for--.

Signed and Sealed this

Twelfth Day of October, 1999

Attest:

Q. TODD DICKINSON

*Attesting Officer*   *Acting Commissioner of Patents and Trademarks*